May 20, 1958
J. J. D'ELIA
2,835,040
MICROMETER GAUGE
Filed May 29, 1956
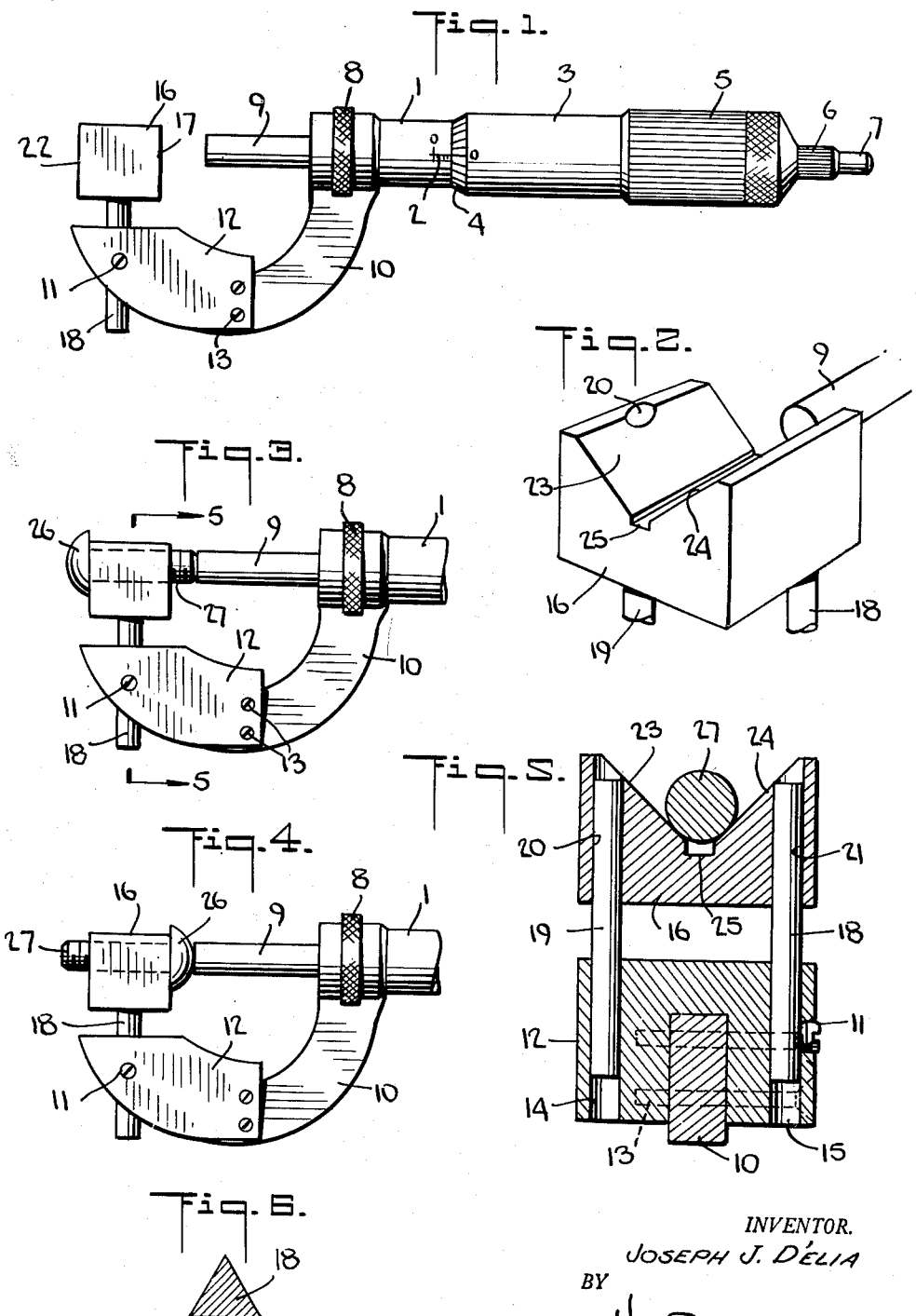
INVENTOR.
JOSEPH J. D'ELIA
BY
ATTORNEY

United States Patent Office 2,835,040
Patented May 20, 1958

2,835,040

MICROMETER GAUGE

Joseph J. d'Elia, New Rochelle, N. Y.

Application May 29, 1956, Serial No. 588,082

4 Claims. (Cl. 33—167)

This invention relates to a form of micrometer gauge, more specifically a micrometer for measuring screws and bolts.

In the past it has been one of the problems in a mass production plant to measure accurately the length of screws and bolts used on the assembly line. Many devices have been used in an attempt to solve this problem but none have been truly successful. For example, micrometers with interchangeable barrel spindle and gauge assemblies have been used. However, these micrometers will not provide an accurate means for measuring the length of the screw threads as there is no provision made for taking the measurement from the under side of the head to the tip of the screw, nor is there provision for taking the measurement from the under side of the head to the uppermost portion of the head. The same criticism is made of those devices which provide a micrometer with a plurality of replaceable spindle points allowing the spindle to enter into spaces otherwise inaccessible to it.

It is among the objects of this invention to provide a micrometer which may be used to measure both the length of the shanks of screws and bolts and the thickness of their heads.

It is also among the objects of this invention to provide such a micrometer which is to some degree adjustable so that it may accommodate screws and bolts of a wide range of diameters.

It is further among the objects of this invention to provide a handy tool for assembly line production for measuring the lengths of screws and bolts as well as the thickness of their heads, which can with standard micrometer accuracy be used to control production on a large scale.

In practicing this invention, there is provided a micrometer gauge having a yoke, a barrel, a spindle, the customary means for advancing and retracting the spindle together with a scale (customarily reading to tenths of thousandths of a ninch). To the yoke in the preferred form of the invention, there is attached an adapter which consists of a member U-shaped in cross-section which fits over the end of the yoke furthest from the spindle and which is fastened to the yoke by one or more screws passing through both the adapter and the yoke. The adapter contains two cylindrical holes which are so positioned as to engage a corresponding number of pins vertically depending from the anvil. The said anvil is so designed as to be adapted to receive and retain bolts and screws in a position wherein the length and the thickness of their heads may be measured. In the preferred embodiment of this invention, such design consists of a trough with angular sloping sides which run along a line parallel to or coincident with the axis of the spindle and barrel. The adapter may be provided, if desired, with one or more set screws bearing against the vertically depending pins to aid in retaining the anvil in a given position if the frictional contact is insufficient to do so.

Of course, it is within the scope of the present invention to modify the aforementioned preferred form by the use of pins angular or oval in cross-section. In such a case it would be unnecessary to have more than one pin although two or more could be used without departing from the spirit of this disclosure.

In operation, the micrometer spindle is retracted to provide the greatest possible opening between the anvil and the end of the spindle. The screw or bolt to be measured is placed in the trough of the anvil with the head away from the spindle. The anvil is then adjusted vertically so that the axis of the shank of the screw or bolt is alined with the axis of the spindle. By holding the head of the screw or bolt firmly against the side of the anvil away from the spindle and advancing the spindle until it contacts the end of the shank of the screw, the length of the shank may be read as accurately as the micrometer is designed to read.

To measure the thickness of the head of the screw or bolt, the screw or bolt is placed in the anvil with the head towards the spindle. The spindle is then advanced until it contacts the head and presses it firmly against the side of the anvil nearest the spindle. Thus at this point the precise thickness of the head may be accurately read on the micrometer scale in the usual manner.

In the accompanying drawings constituting a part hereof and in which like reference characters indicate like parts, Fig. 1 is a side view of a micrometer with the measuring device attached;

Fig. 2 is a perspective drawing of the anvil;

Fig. 3 is a side view of a portion of the micrometer as in Fig. 1, showing a screw in position for measurement of the length of its shank;

Fig. 4 is the same as Fig. 3, showing the screw in position for measurement of the thickness of its head, and Fig. 5 is a section taken along line 5—5 of Fig. 3.

Fig. 6 is a plan view of a pin of non-circular cross-section.

Referring to the figures, there is provided a micrometer comprising a barrel 1 with a conventional scale 2 engraved thereon, a handle 3 with a fine scale 4 thereon and an enlarged portion 5, a narrow portion 6 and a clutch handle 7, said handle being adapted to advance a spindle 9 by rotation thereof, a locking nut 8, a yoke 10 fitted with an adapter 12 held onto the said yoke by screws 13 and containing holes 14 adapted to receive pins 18 and 19 depending from anvil 16.

Anvil 16 is provided with a trough 25 and sloping sides 23 and 24 extending from side 17 to side 22. The pins 18 and 19 are inserted permanently in holes 20 and 21 of the anvil and project downward into holes 14 and 15 of the adapter 12.

In operation, the micrometer is grasped preferably at yoke 10 and the spindle 9 is retracted by counter-clockwise rotation of handle 3. A screw with a head 26 and shank 27 is placed upon the anvil so that it rests over trough 25, contacting sides 23 and 24 with the head 26 against side 22 of anvil 16. The head is then placed firmly against side 22, the handle 3 is rotated in a clockwise direction by rotating clutch handle 7 in clockwise direction, thus advancing spindle 9 until it contacts the shank 27 of the screw being measured. At this point the clutch handle 7 will slip and permit the spindle to be advanced no further. Locking nut 8 is turned to the locking position, thus preventing any further movement of the spindle or handle. The length of the shank may then be read on the scales 2 and 4 in the usual manner. If necessary, the anvil 16 may be adjusted vertically by sliding pins 18 and 19 up or down so that the axis of the screw passes through the axis of the spindle 9, thereby insuring an accurate measurement.

To measure the thickness of the head 26 of the screw, the spindle is retracted to its most distant point from side 17 of anvil 16. The screw is then placed in the anvil over trough 25 contacting sides 23 and 24, with the head 26 against side 17. The spindle 9 is then advanced by clockwise rotation of the handle 3, which is accomplished by rotating clutch handle 7 until spindle 9 contacts the head 26 of the screw being measured. As before, the clutch handle 7 will then slip, preventing the spindle from being advanced any further. Locking nut 8 is then turned to its locked position and the scales 2 and 4 are read to determine the exact thickness of the head 26. As in the measurement of the shank, it may be necessary to adjust the anvil vertically by sliding it up or down on pins 18 and 19 to aline the axis of the screw shank 27 will that of the spindle 9.

The locking nut 8 is then turned to its unlocked position, the spindle is withdrawn by rotation of handle 3 in counter-clockwise direction by turning narrow portion 6 until spindle 9 is withdrawn as far as desired. The screw is then removed and the device is ready to use as before.

While only one specific embodiment of this invention has been described, nevertheless other variations may be made without departing from the spirit or scope thereof. For example, the anvil may be mounted upon the yoke directly without benefit of the adapter, by means of a single pin non-circular in cross-section This would obviate the necessity of the use of such an adapter and would present some advantages in the manufacture and use of this device. Furthermore, set screws may be provided in the yoke or adapter as the case may be, to prevent the anvil from sliding vertically while in operation. In addition, the scale may be so marked as to indicate zero when the dimension to be measured is correct according to the desired specifications and will read in terms of thousandths of an inch plus or minus the desired length. This variation would be particularly well suited to assembly line production where the operator is primarily interestd in determining whether the particular screw or bolt being measured falls within the permitted tolerance for the particular dimension being measured.

These and other changes may be made within the spirit of the invention, which is to be broadly construed and not to be limited except by the character of the claims appended hereto.

I claim:

1. In a micrometer gauge having a yoke, an anvil, a barrel, a spindle, and means for advancing and retracting said spindle, the improvement which comprises the anvil mounted on the yoke so that it is slidable in the plane of the yoke and the spindle and transversely to the axis of said spindle, said anvil being adapted to receive and retain bolts and screws in a position wherein their length and the thickness of their heads may be measured, said anvil being provided with a slidable vertical mounting comprising at least one vertical pin projecting downward from said anvil, and an adapter affixed to the yoke, said adapter being provided with holes corresponding in number and cross-section to the vertical pins, and so proportioned as to engage said pins when the anvil is in operative position.

2. A gauge according to claim 1 in which the pins are cylindrical in cross-section and at least two in number.

3. A gauge according to claim 1 wherein at least one set screw is provided in the adapter which bears against at least one of the pins.

4. A gauge according to claim 1 wherein only one pin, non-circular in cross-section, is substituted for said vertical pins.

References Cited in the file of this patent

UNITED STATES PATENTS

| | | |
|---|---|---|
| 1,333,453 | Sardo et al. | Mar. 9, 1920 |
| 1,602,292 | Walden | Oct. 5, 1926 |
| 2,444,136 | Leasure | June 29, 1948 |
| 2,521,428 | Vizuete | Sept. 5, 1950 |
| 2,541,821 | Kneissler | Feb. 13, 1951 |